United States Patent [19]
Keiner et al.

[11] 3,756,534
[45] Sept. 4, 1973

[54] FILM CARTRIDGE

[75] Inventors: Heinz Keiner, Oberndorf; Helmut Richter, Braunfels; Wilhelm Schafer, Wetzlar; Willi Goldberg, Steindorf, all of Germany

[73] Assignee: Ernst Leitz G.m.b.H., Wetzlar, Germany

[22] Filed: Aug. 31, 1970

[21] Appl. No.: 68,308

[30] Foreign Application Priority Data
Sept. 13, 1969 Germany.................. P 19 46 536.2

[52] U.S. Cl.................................. 242/194, 352/72
[51] Int. Cl........................ G03b 1/04, G11b 15/32
[58] Field of Search.................... 242/194, 197–200, 242/71.1, 71.2; 352/72, 78

[56] References Cited
UNITED STATES PATENTS

| | | | |
|---|---|---|---|
| 3,037,719 | 6/1962 | Behmann | 242/71.1 |
| 3,398,912 | 8/1968 | Weggeland | 242/71.2 |
| 3,415,599 | 12/1968 | Winkler et al. | 352/78 |
| 3,286,945 | 11/1966 | Steisslinger | 242/71.2 |

*Primary Examiner*—Leonard D. Christian
*Attorney*—Krafft and Wells

[57] ABSTRACT

The take-up spindle of a super-8 format film cartridge is maintained in position by friction means. Rewinding of the spindle is accomplished by overcoming the resistance of the friction means. The take-up spindle has cams on its surface and the friction means includes a friction ring mounted in the cartridge and surrounding the take-up spindle having two resilient tongues.

2 Claims, 7 Drawing Figures

PATENTED SEP 4 1973 3,756,534

FILM CARTRIDGE

BACKGROUND OF THE INVENTION

1. Field of the Invention

The invention relates to cartridges for super-8 format film; more particularly the invention pertains to super-8 format film cartridges capable of being readily rewound.

2. Description of the Prior Art

In the conventional standardized cartridge wherein movie films in the so-called super-8 format are marketed by various film manufacturers, the take-up spindle of the film cartridge is surrounded by a locking ring which prevents reverse rotation of the spindle. Therefore, the spindle can be turned only in the direction by which it winds the film thereupon. The blocking of the reverse rotation is necessary in order to prevent film already wound upon the spindle from unwinding and loosening when the cartridge is removed from the camera with only partially exposed film. In such a situation, the shaft on the camera side is disengaged from the coupling claw of the cartridge. Thus, the take-up spindle is free to move backwards under the tension of the film. This would result in the reeling up of the uppermost layers of the film if no special blocking means against reverse rotation were provided.

This blocking of the reverse rotation exhibits the disadvantage that it is basically impossible to effect lap dissolves with super-8 film. As is known, the method of effecting lap dissolve includes the steps of slowly closing the shutter at the end of a scene and stopping the camera, then transporting the footage on which the shutter closing operation was recorded back inside the camera, and finally recording the beginning of the new scene, at a gradually opened shutter, on the backwound, previously exposed strip of film. However, in case of the super-8 cartridges, due to the blockage of the reverse rotation of the take-up spindle, a reverse transport of the film is basically impossible. Lap dissolves therefore cannot be effected. Thus, there exists a problem of finding means making it possible to produce lap dissolves when using super-8 cartridges.

SUMMARY OF THE INVENTION

According to the present invention, this problem of making lap dissolves is solved by providing means so that the take-up spindle of the cartridges is subjected to friction, and so that the spindle can be turned back by overcoming this friction.

The friction can preferably be produced by a spring element, for example a leaf spring, effective between the take-up spindle and the cartridge housing. The element can be fixedly arranged at the cartridge housing and exert pressure on the take-up spindle, but it can also be fixedly mounted to the take-up spindle and frictionally contact a wall of the housing.

By this arrangement of the invention, the posed problem has been solved. The previously known blockage of the take-up spindle against reverse rotation, effected by the mating of parts, is overcome, for it is quite readily possible to turn the take-up spindle backwards against the frictional force, with the required amount of strength, so that a return transport of the film by the force of the drive motor and thus also lap dissolves are then made possible. Yet, a loosening of the uppermost layers of the film from the film reel on the take-up spindle is still prevented because tensioning of the film is insufficient to overcome this friction.

In a further embodiment of the invention, the friction effective between the take-up spindle and the cartridge housing is less during forward rotation than during reverse rotation, so that the motor of the camera, during the forward rotation normally taking place, is burdened by as little additional resistance as possible.

According to the present invention, this can be achieved in three ways:

Firstly, it is possible to insert, in place of the locking ring arranged in the commercially available cartridges, a friction ring extending around the take-up spindle, the bore of which friction ring is defined by two substantially semicircular curve paths, the centers of which are mutually displaced in the direction of the ends of the semicircles, wherein the branches of the two curve paths in the proximity of the centers are clearcut and undercut and form two resilient tongues, and wherein the end of each tongue facing the center is beveled at an angle of about 45° so that the curve path facing the cams attached to the take-up spindle during the forward rotation of the spindle forms an obtuse angle with the rotational path of the cams, whereas the curve path facing the cams during reverse rotation forms an acute angle with the rotational path of the cams.

Thus, this special embodiment presumes that the take-up spindle is provided with the same cams as exhibited also by the take-up spindle in the cartridges according to the state of the art. The cams flatly contact, during forward movement, the outwardly yielding tongues, which latter are readily resilient and offer hardly any resistance against the rotation of the cams. During reverse movement, the cams meet the steeply beveled tip, and it is possible in this case to further turn the take-up spindle, the only difference being that substantially more force must now be exerted for this purpose. This force can easily be supplied by the drive motor in reverse gear, making a backward transport of the film possible. However, sufficient force cannot be supplied by the tensioning of the film, so that the loosening of the upper film layers of the reel is still prevented. The friction ring can also be conventionally arranged to be reciprocating, so that no resistance is exerted by the friction ring against the forward movement. In this embodiment, the resilient tongues are arranged at the level of the lateral displacement direction.

Secondly, the locking ring can be retained in the cartridges and can continue to constitute the conventional blocking means in combination with the cams of the take-up spindle. In this case, according to the invention, the take-up spindle is in contact with the blocking means by way of a friction coupling. For example, the hub of the take-up spindle can be surrounded by a sleeve having a longitudinal slot and being resiliently clamped to the hub. The sleeve also carries the cams which cooperate with the locking ring, and when the camera is switched to reverse movement, the sleeve with the cams adheres to the locking ring, but yet a backwind of the film is possible, namely by overcoming the friction between the sleeve and the hub. On the other hand, however, the tension on the film windings is not large enough to overcome this friction, so that the blocking effect of the locking ring remains in effect with respect to the winding up of the film.

In place of the slotted sleeve, it is also possible to put a closed sleeve over the hub; this sleeve can be connected with other spring elements resting on the take-up spindle and producing a friction connection between the sleeve and the spindle.

Thirdly, the different friction in case of forward movement and in case of reverse movement can also be produced by removing the locking ring of the cartridge and slipping a loop spring over the bearing pin which carries the take-up spindle, an end of the spring being fixedly attached to the hub of the spindle The coil spring is wound in such a manner that it is opened during forward movement, whereas it is tightened during reverse movement. The same success is achieved by attaching one end of the spring to the cartridge housing and placing the spring in a corresponding manner over the hub of the take-up spindle.

DESCRIPTION OF THE DRAWINGS

In the drawings, the invention is explained in greater detail with reference to several embodiments, to wit.

DESCRIPTION OF THE PREFERRED EMBODIMENTS

Figure 1:
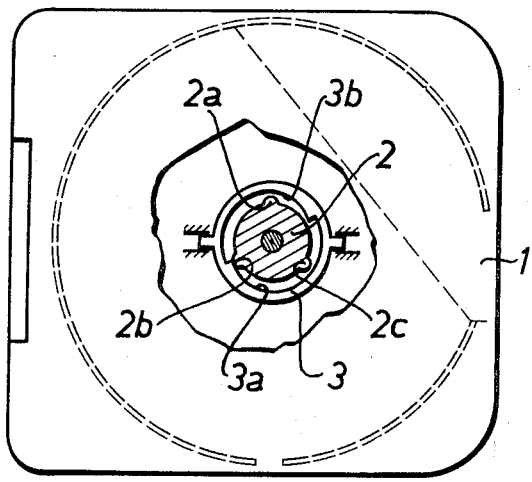
FIG. 1 is a schematic top view of a film cartridge with means to prevent reverse rotation according to the prior art.

In FIG. 1 there is shown a cartridge housing 1 oriented with the take-up side facing the observer. The side of the cartridge has been removed. In the center, the take-up spindle 2 is rotatably mounted; this spindle is illustrated in a cut-away fashion, in order to better make visible the parts essential for its function. The spindle 2 is surrounded by a locking ring 3, the latter being mounted in a partition of the cartridge housing so as to be readily displaceable laterally.

The bore of the ring 3 is formed by two approximately circular-arc-shaped curve paths 3a, 3b, extending eccentrically with respect to the center of the ring and passing over into each other at two radial edges. Three cams 2a, 2b, 2c, of the take-up spindle 2 cooperate with the curve paths in such a manner that the cams, upon a rotation of the clockwise direction, always displace the ring from one side to the other, so that the spindle can freely rotate in this direction. However, upon a rotation in the counterclockwise direction, one of the three cams 2a, 2b, 2c, meets the most proximate radial edge, at which it is caught. Consequently, the rotation in the counterclockwise direction is blocked. This backwind blockage illustrated in FIG. 1 represents the state of the art from which the invention starts.

Figure 2:
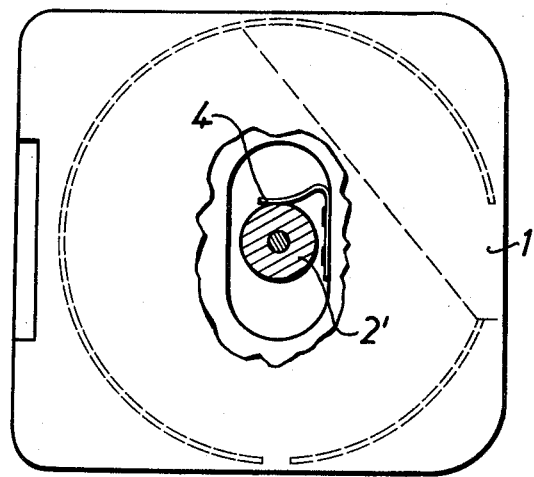
FIG. 2 is a schematic top view of a film cartridge with friction spring means according to the first embodiment of the invention.

In FIG. 2, a first embodiment of the invention is illustrated, eliminating the disadvantage of this backwind blockage, namely the impossiblity of effecting lap dissolves, and yet providing safety against a loosening of the upper film windings from the take-up spindle. In this embodiment, the hub 2' of the take-up spindle is subjected to the force of a friction spring 4 pressing on the hub 2' and braking the latter. The locking ring 3 is not employed. The friction of the spring 4 can readily be overcome by the motor of the camera, so that it is also possible to conduct a backwind of the take-up spindle. However, the friction cannot be overcome by the tension of the film windings, so that an inadvertent loosening of the uppermost film windings is impossible.

Figure 3:
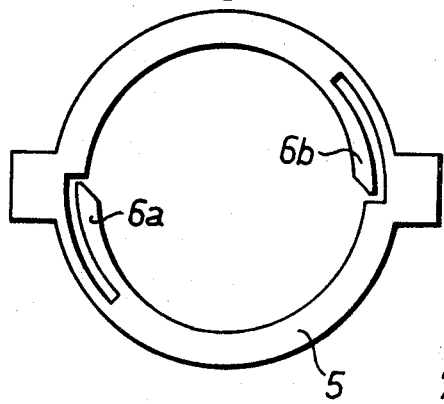
FIG. 3 is a top view on an enlarged scale of a friction ring which, according to a second embodiment of the invention, is inserted in the cartridge in place of the locking ring.

The further embodiments all start with the idea that the take-up spindle should not be subjected to any friction, if possible, during the forward movement, in order to prevent additional load on the motor of the camera. For this purpose, FIG. 3 for example, shows a friction ring 5 which is inserted in the cartridge in place of the locking ring, in accordance with the invention. The friction ring exhibits at its inner diameter likewise two eccentrically extending circular arcs 6a, 6b, but these arcs are clearcut and undercut with their branch in the proximity of the center, in order to obtain a resilient effect of these branches. Furthermore, the inner edge of each of the two free branches is beveled at an angle of approximately 45°.

The function of this friction ring is as follows:

Upon forward rotation of the spindle, the ring 5 is pushed to and fro by the cams 2a, 2b, 2c in the same manner as the locking ring 3. In this connection, only a quite minor friction is opposing the rotation of the take-up spindle 2, this same friction in the devices of the prior art being likewise exerted against this forward movement by the locking ring 3. Although there is a certain amount of friction between the cams and the ring, this friction is even smaller in case of the friction ring 5 than in case of the conventional locking ring 3, due to the resilient construction of the circular arcs 6a, 6b.

Upon effecting a reverse movement, one of the cams 2a, 2b, 2c meets the closed beveled inner edge of the circular arcs 6a, 6b and first is caught by this edge. However, the free resilient end of the respective circular arc an be pressed toward the outside, if the force required therefor is expended. The basic idea behind this embodiment is again that the drive motor is capable of exerting the required force so that, when the camera motor is switched to reverse, a backwind of the film is possible by overcoming the friction between the cams and the resilient free branches of the circular arcs. However, this required amount of force cannot be supplied by the tendency of the film windings to detach themselves from the film reel.

Figure 6:
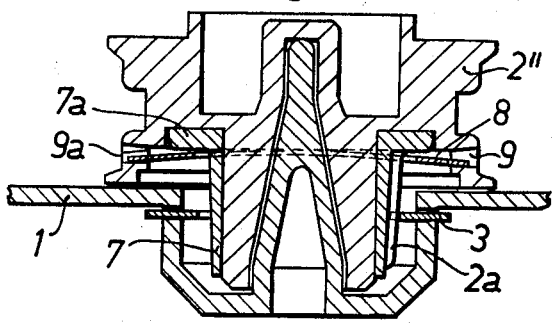
FIG. 6 is a view in cross section through a cartridge wherein the take-up spindle, according to a third embodiment of the invention, is surrounded by a closed sleeve.
Figure 4:
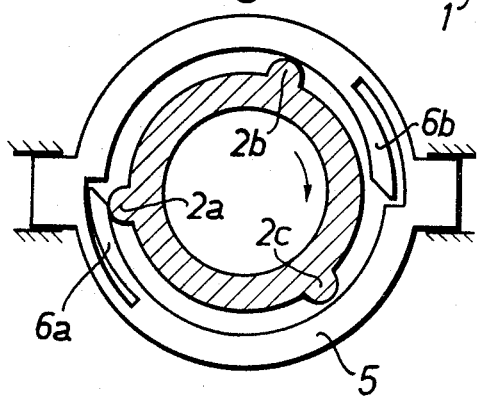
FIG. 4 is a schematic top view of a friction ring according to a second embodiment of the invention, with the spindle inserted in the forward winding position.
Figure 5:
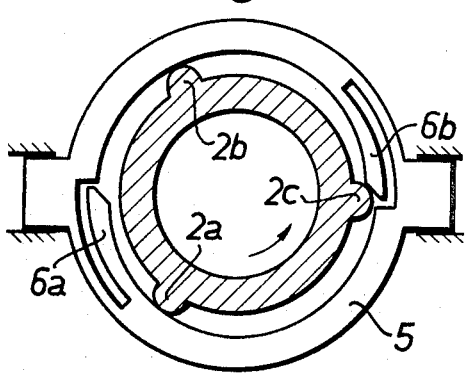
FIG. 5 is a schematic top view of a friction ring according to a second embodiment of the invention, with the spindle inserted, in the reverse winding position.
Figure 7:
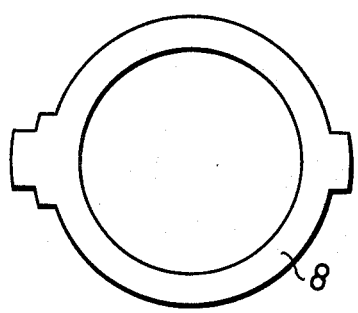
FIG. 7 is a top view of the spring ring employed in the embodiment according to FIG. 6.

The same idea likewise underlies all other embodiments. In the example according to FIG. 6, the hub of the take-up spindle 2'' is covered by a closed sleeve 7 carrying the cams 2a, 2b, 2c, which latter cooperate in a conventional manner with the locking ring remaining in the cartridge. The sleeve 7 is provided with a flange 7a, by means of which the sleeve rests in a recess of the take-up spindle. From the outside, a bent spring ring 8 presses against this flange, this ring resting in slots 9, 9a of the take-up spindle. FIG. 7 shows the spring ring in a plan view. The function of a cartridge constructed in this manner is unchanged with respect to the state of the art during forward movement, i.e., the cams 2a, 2b, 2c push the locking ring to and fro without any large amount of resistance. However, during reverse movement, only the sleeve 7 is actually blocked, which latter is caught with one of its cams 2a, 2b, 2c at the locking ring. In contrast thereto, the take-up spindle 2'' can turn backwards against the friction between the sleeve flange 7a and the spindle.

The spring ring 8 has outwardly extending projections thereon. These projections are located at opposite positions on the spring ring. The ring is bent in a direction approximately at right angles to the center line of the projections.

In the embodiment according to FIG. 8, as compared to the example according to FIG. 7, only the spring means is changed. Instead of the spring ring 8, the sleeve 10 exhibits resilient arms 10a, 10b, 10c (FIG. 8) fixedly connected with the sleeve this The sleeve and the arms can, for example, be injection molded of one piece. A cover plate 11, which is for example, cemented together with the take-up spindle, prevents the sleeve from slipping off the hub.

In the example of FIG. 10, in place of a closed sleeve, a longitudinally slotted sleeve 12 is placed on the hub 2''' of the take-up spindle. This sleeve can be inherently pretensioned, so that this alone effects the requited friction. However, it is also possible to surround the sleeve additionally with a spring ring 18 supplying the required amount of friction. It is furthermore possible to insert a spring ring (not shown) between the end 12a of the sleeve and the spindle, which spring ring presses the shoulder 12b of the sleeve, which shoulder is disposed in a groove of the hub, in the axial direction against the side wall of the hub and thus produces the friction.

In the embodiment according to FIG. 11, the sleeve 13 consists of a spring band which is ovally deformed and thus is seated on the hub 2'''' with pretensioning. FIG. 12 shows that the blocking cams 2a, 2b, 2c are in thic case pressed out of the sleeve 13 from the inside.

FIGS. 13 and 14 show embodiments wherein loop springs 14 and 15 are employed for producing the friction and wherein the locking ring 3 is removed from the cartridge. In the embodiment according to FIG. 13, the loop spring 14 is placed over the pin 17 carrying the take-up spindle 16 and is attached with one end of the hub 2''''' of the take-up spindle. During forward movement, wherein, in the illustration of FIG. 13, the right side of the spindle moves out of the plane of the drawing and the left side of the spindle enters the plane of the drawing, the loop spring is wound up so that no friction can occur between the spring and the pin 17. During reverse movement, the loop spring 14 is, however, closed, resulting in friction at the pin. As in the remaining embodiments, this friction can, however, be readily overcome by the motor of the camera, so that a backwind of the film is possible; however, this friction, again, cannot be overcome by the tension of the film, so that protection against unreeling of the film windings is achieved.

The example of FIG. 14 is effective accordng to the same principle. In a modification of the embodiment of FIG. 13, the loop spring 15 is, however, slipped over the hub 2''''' of the take-up spindle 16 in this embodiment and is attached with one of its ends at the cartridge housing proper.

We claim:

1. A film cartridge for super-8 format film including a take-up spindle mounted for forward and reverse rotation rotatably mounted in said cartridge and friction means operative on said spindle to resist but not block reverse rotation thereof, wherein the take-up spindle has a plurality of cams on the surface thereof and wherein said friction means includes a friction ring mounted in said cartridge and surrounding the take-up spindle, said ring having a bore defined by two substantially semicircular arcs, the centers of said arcs being displaced with respect to each other in the direction toward the ends of the semicircles, the two arcs having branches which are clear cut and undercut and which form two resilient tongues, the end of each tongue being beveled at an angle of about 45° whereby the curved path facing the cams on said spindle during forward rotation of said spindle forms an obtuse angle with the rotational path of the cams and whereby the curved path facing the cams on said spindle during reverse rotation of said spindle forms an acute angle with the rotational path of the cams.

2. A film cartridge according to claim 1, wherein said friction ring is positioned for lateral reciprocation with respect to said spindle.

* * * * *